March 24, 1970  C. R. MILTON  3,502,205
CONTAINER
Filed Dec. 13, 1967
Fig. 1.
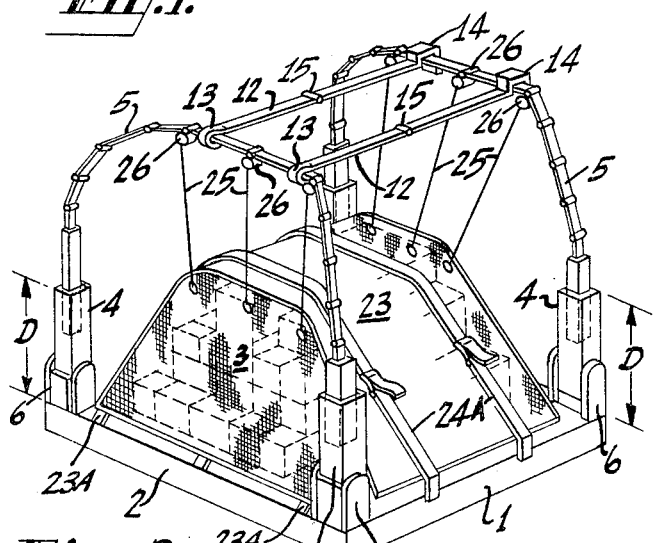
Fig. 5.
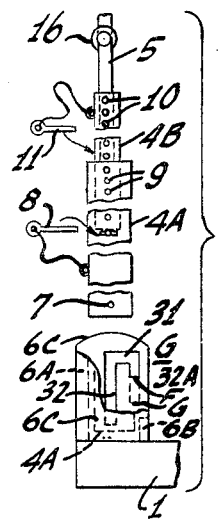
Fig. 2.
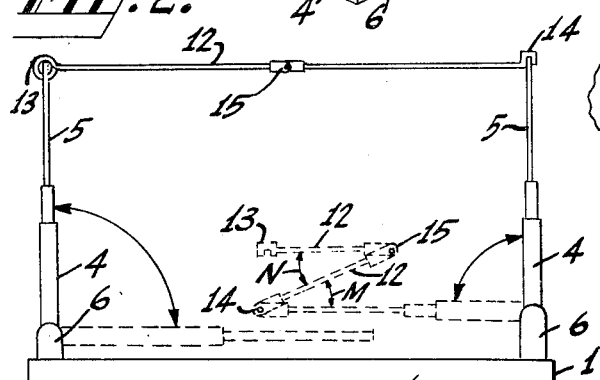
Fig. 3.
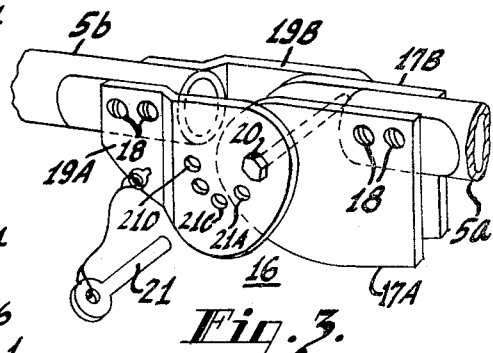
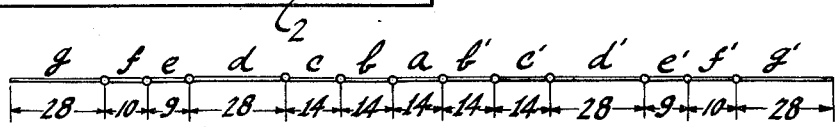
Fig. 6.
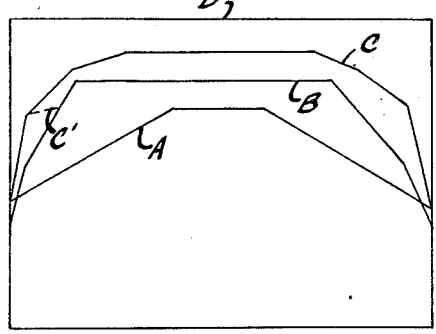
Fig. 4.
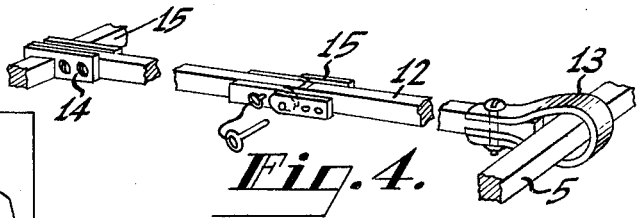
Fig. 7.
INVENTOR.
CHARLES R. MILTON

United States Patent Office 3,502,205
Patented Mar. 24, 1970

3,502,205
CONTAINER
Charles R. Milton, 54 Surrey Lane,
Sudbury, Mass. 01776
Filed Dec. 13, 1967, Ser. No. 690,200
Int. Cl. B65d 19/44
U.S. Cl. 206—46        7 Claims

ABSTRACT OF THE DISCLOSURE

A container defining a volume of controllable size and profile is generated by providing at least one upright arch member which includes an upper, bow portion of bendable material.

---

The present invention is directed to a reusable container, particularly to a container having a base or pallet on which may be laid cargo of a wide number of contours and dimensions. Such palletized cargo containers presently are used commercially to handle freight in widely varying types of vehicles, e.g. railroad cars, highway trucks, airplanes, sea-borne containers adapted for highway trucks, etc.

BACKGROUND OF THE INVENTION

In the past, it has been commercially feasible in some cases to use cargo containers particularly adapted for use in a particular class of vehicles, such as highway trucks, where cargo space has substantially modular dimensions and other conditions are substantially the same from vehicle to vehicle and from shipper to shipper. In other cases, it has been necessary to create a container for use in a specific vehicle within a class. An example of the latter case is where a container is made particularly to fit the cargo hatch or space within a specific freight-carrying airplane. In the face of these problems, the number of types of cargo containers has proliferated; and with increasing number of vehicle types and increasing sophistication of shipping needs, the total number of container types continues to increase. Further, owing to the specialized needs of each class of carrier, it usually is not possible to use a container designed for one class of vehicle in a vehicle of different class. For example, a highway truck pallet, suitable for loading by forklift truck, may not pass through the cargo hatch of some airplanes, is too heavy for airfreight use, may not be adapted for loading by powered rollers nor for being tied down in the manner required in airfreight practice.

Therefore, it is an object of this invention to provide a new and improved container.

Another object of the invention is to provide a cargo container which may be shaped to a number of profiles.

Another object of the invention is to provide a cargo container whose volume and contour can be adjusted to substantially the shape and contour of cargo piled on the pallet, thus eliminating the need for void-filling dunnage within the container.

Another object is to provide an improved container having a cover, such as netting or a tarpaulin within the container which closely conforms to the outline of the cargo.

Another object is to provide an improved container with some or all of the above characteristics which also is foldable into a minimum space for storage or shipment.

SUMMARY OF THE INVENTION

A container in which the present invention may be practiced has a base or pallet of preferably rectangular plan outline. The pallet is provided with an upwardly facing surface to receive the cargo and from which at least one arch member extends upwardly to an outline of the front elevation of the container and its cargo-carrying space and volume. The arch member includes a bow having first and second ends, which are respectively secured to opposing sides of the base by first and second pieces.

According to an embodiment of the invention, the bow is made of bendable means which may be set to a particular path or configuration to determine the outline of the bow and the arch member of which the bow is a part. In this manner, the profile of an end elevation of the container may be set to a configuration particularly suited to fit through a restricted vehicle cargo opening or into a restricted cargo space; and when used in a different class of vehicle may be expanded to a different profile defining a larger volume within the container.

For a better understanding, there follows a detailed explanation of a preferred embodiment of the invention. In this description, reference is made to the drawings attached to and forming a part of this specification, and in which:

FIGURE 1 shows a perspective view of a container embodying the present invention;

FIGURE 2 shows a side elevation of the container shown in FIGURE 1;

FIGURES 3, 4 and 5 show details of construction of the FIGURE 1 container;

FIGURE 6 shows a bow in straightened position; and

FIGURE 7 shows various profiles of end elevations into which the FIGURE 1 container may be disposed.

The container of FIGURE 1 has a base or pallet 1, which may be made in any of a number of fashions. Cargo 3 of irregular contour or outline may be laid on the upwardly facing surface 2 of base 1. It should be noted that the irregular outline of cargo 3 requires some means (other than direct strapping between the cargo and base 1) to prevent shifting of cargo 3 on base 1. The ability of the present container to prevent such shifting on base 1 is treated later in this description.

In order to define the cargo-receiving volume of the container and to provide a volume-defining framework within which cargo 3 is to be restricted, arch members are disposed at opposite ends of base 1. Each arch member comprises a pair of post pieces 4, each of which is pivotally attached (in the manner explained below) to a pedestal structure 6 by studs 7 extending from opposite sides of and near the lower end of each piece 4. Each structure 6 is fixed to surface 2 at a corner of base 1 by any suitable means, so that the post pieces 4 of each arch member are disposed in this manner at opposing sides of base 1.

Each pivot structure 6 comprises sides pieces 6C indicated in FIGURE 5. Side pieces 6C are parallel to each other and also substantially parallel to the lengthwise axis of base 1. In the inward-facing surface of each side piece 6C, there is cut a hooked-shaped groove 31 of substantially uniform depth. The longer portion 32 of groove 31 is disposed to extend vertically and centrally within its side piece 6C; the shorter leg 32A of groove 31 is disposed to extend vertically, but closer to the inward-facing (with respect to the length of base 1) side of pivot structure 6. Each pivot structure 6 also includes: a back, retainer portion 6A which extends between the side edges of side pieces 6C; and a front piece 6B extending between the side pieces 6C at the above-mentioned inward facing side of pivot structure 6. The studs 7 of each piece 4 (which is shown in exploded relation to structure 6 in FIGURE 5) are received within the slots 31 of the side pieces 6C of the appropriate one of pivot structures 6. The longer portion 32 of the slots 31 extend downwardly to a point which allows studs 7 to constrain the lower end of piece 4 to a position (indicated by the dashed portion of 4A) within the cup formed by pieces 6A, 6B and 6C. With the piece 4C lowered to this extreme position, pieces 6A and 6B restrain post member 4 against rotational movement about studs 7.

In order to allow post member 4 to be rotated about studs 7 (for reasons set forth below) post member 4 is lifted with respect to pivot piece 6 until studs 7 reach the upper, horizontally-extending portion of groove 31; at this point piece 4 may be moved inwardly (with respect to base 7) and dropped until each of the studs 7 encounters the bottom end of groove portions 32A. At this point, the bottom end of post piece 4 is removed from the above mentioned cup portion of piece 6, so that piece 4 is free to rotate about pins 7 in a direction such that the top end of piece 4 moves toward the center of base 1. It is pointed out that the pivot structures disposed at the right hand end of base 1, as viewed in FIGURE 2, have slot portions 32A which extend to point F, so that post 4 is pivoted at point F above surface 2 of base 1, whereas, the pivot pieces 6 disposed at the left hand end of base 1 have slot portions 32A which extend (as indicated by the dashed portion shown in FIGURE 5) to point G, which is located at a distance substantially closer to surface 2 of base 1 than point F.

Each arch member also includes a bow 5. Each bow 5 has first and second ends which are received within openings extending centrally along the lengths of the post pieces 4. Each bow 5 and its pair of post pieces 4 complete the top and the sides, respectively, of one of the arch members. As indicated in FIGURE 2, the arch members extend upwardly from surface 2 in substantially parallel relation to each other.

Each post piece 4 comprises an outer member 4A and a telescoping, inner member 4B, as indicated in FIGURE 5. With a post piece extended to a desired length, a retainer pin 8 may be inserted in one of openings 9 in outer member 4A, in order to fix the position of the lower end of inner member 4B within outer member 4A. This, in turn, determines the height of the tops of each post member 4 above base surface 2. While this height is indicated as uniform distance D in FIGURE 1, it is to be realized that a container using this invention may be rigged so that the post heights of the arch member at one end of base 1 are different from the post heights of the arch member at the other end of base 1. Further, the posts within a single arch member may be made different from each other.

As indicated in FIGURE 5, each end of bow 5 is received within the opening passing through the length of inner telescoping post member 4B. The depth to which each end of bow 5 extends within its corresponding post member 4B is determined by the choice one of holes 10 in member 4B receiving retainer pin 11, and on which an end of bow 5 rests.

From the description thus far, it has been shown that by adjusting the height of telescoping posts 4 (by use of retainer pins 8) and the depth of insertion of the ends of bows 5 in sections 4B (by the use of retainer pins 11), the average height of each bow 5 above surface 2 may be selectively set.

With arch members disposed at opposite ends of base 1, in the above described manner, the arch members (as indicated by the dashed portions in FIGURE 2) are inwardly foldable from their upright positions to positions substantially parallel to the surface 2 of base 1, by pivoting each arch member about the mounting studs 7 of its component posts 4. The arch members are made foldable in order to minimize the space occupied by the container when it is not in use. In order to allow the right hand arch member shown in FIGURE 2 to fold a position above and parallel to the folded position of the left hand arch member, the posts 4 of the left hand arch member pivot at points closer to surface 2 than the posts 4 of the right hand arch member, as was previously described.

With the arch members in their upwardly extending positions, the members are further maintained in their substantially parallel relation by one or more stringers 12, shown in FIGURES 1 and 2. These stringers 12, which also function to further define the volume of the container, extend between the upper regions of bows 5 on the opposing arch members, and are made of rigid (preferably tubular) material. In order to detachably connect the left hand end of each stringer 12 shown in FIGURE 2 to bow 5 (so that the arch members may be folded), the left hand end of stringer 12 (as shown in FIGURE 2) has a hook portion 13 secured thereto. Hook portion 13 is adapted to be laid over and engages a short section of the bow 5. Further, in order to allow the right hand arch member to be folded conveniently, the right hand end of each stringer 12 is rotatably attached to bow 5 by a loop 14 (which is secured to the end of stringer 12). Loop 14 on each stringer 12 surrounds a short length of bow 5 of the right hand arch member. In order to facilitate folding the container into minimum space, each stringer 12 is provided with an articulating hinge 15 substantially at its midpoint. This hinge 15 allows each stringer 12 to be folded in the directions indicated by arrows M and N along its length, as indicated by the dashed lines in FIGURE 2 (where a stringer 12 is shown partially folded for the sake of clarity in the drawing).

Attention next is directed specifically to bow 5 which is provided for each of the above-described arch members. As pointed out above, the ends of bow 5 are received within a pair of post pieces 4, so that the bow 5 and its pair of post pieces each form one of the arch members. In order to provide the present container with a front elevation profile of selectable shape, each bow 5 is made of bendable means. In the embodiment shown in FIGURES 1 and 6, each bow 5 comprises a series of sections made of rigid (preferably tubular) material where each section is articulated with respect to the next-adjacent section in the bow 5. For convenience, an odd number of sections is provided in each bow 5. In FIGURE 6, the sections of a bow 5 are shown straightened out for purposes of discussion. It has been found that if the width of base 1 is 120 units, then it is convenient to provide the thirteen sections: $g$, $f$, $e$, $d$, $c$, $b$, $a$, $b'$, $c'$, $d'$ $e'$, $f'$ and $g'$ indicated in FIGURE 6 with relative lengths of substantially 28, 10, 9, 28, 14, 14, 14, 14, 14, 28, 9, 10 and 28, respectively. A series of hinges 16 join next-adjacent bow sections (such as 5a and 5b shown in FIGURE 3) to each other. As indicated in FIGURE 3, each such hinge comprises a first pair of side plates 17A and 17B disposed on opposite sides of and secured by fastening means, such as screws 18, to a bow section (in this particular case, 5a). The hinge also comprises a second pair of side plates 19A and 19B disposed to opposite sides of and secured by fastening screws 18 to the next-adjacent bow section (in this case, 5b). The parallel-extending ends of plates 19A and 19B extending away from section 5b are spread apart from each other by a distance sufficient to freely admit plates 17A and 17B between them. Connection between the above-described parts of hinge 16 also includes a pin 20, which extends across the width of hinge 16 and is journalled at a central point to plates 17A, 17B, 19A and 19B.

Some or all the hinges 16 used to join the sections of bow 5 are provided with a detent which includes a pin 21. Pin 21 is insertable into any one of sets of holes 21A, 21B, 21C and 21D in plates 19A and 19B, and which (when so-inserted) extends through a single pair of appropriately positioned holes in plates 17A and 17B. With pin 21 inserted, the axes of the adjacent set of sections (such as 5a and 5b) joined by a detent-bearing hinge 16 are fixed at a selected angle. These detents are provided in hinges 16 so that a bow, with its ends inserted in post pieces 4 and its detents set to obtain the desired profile, maintains its profile when the arch member of which it is a part is in upright position.

With this explanation of each bow 5 in mind, it is to be seen that each bow and the pair of post pieces 4 which receive the ends of bow 5 may be adjusted to assume any one of many profiles, one of which is indicated in FIGURE 1. Some other possible profiles are indicated by curves A, B, C and D indicated in FIGURE 7. (Note, a variant of the outline C is indicated by dashed portion C' in FIGURE 5.) It is pointed out that with the described arrangement, each arch member is independently adjustable, so that the contour or outline of the container may be made to fit a wide variety of cargo spaces.

In order to protect loosely laid cargo of the type to be carried by this container and in order to prevent such cargo from shifting within the container, it is desirable to provide a flexible covering 23 which is disposed within the arches of the container and over the cargo-receiving surface 2. Cover 23 is secured by any suitable means (such as loops 23A, two of which are indicated in FIGURE 1 and which pass over hooks—not shown—in the edges of base 1) to the edges of base 1. Such a covering may be netting or may be a weatherproof tarpaulin. When covering 23 is in use, it is secured around the outline of cargo 3 by cinch straps 24, which are shown in FIGURE 1 extending from one side of base 1 over cargo 3 and covering 23 to the opposite side of base 1. It is pointed out that another set of straps (not shown in FIGURE 1) may extend from one end of base 1 over covering 23 to the opposite end of base 1. Straps 24 are provided with cinch buckles 24A which are used in a manner well known to tighten and release the straps from around cargo 3. This cargo restraining feature (provided by tightly embracing cargo 3 with covering 23) eliminates the need for void-filling dunnage within the container.

It is to be realized that, while the embodiment of the invention illustrated in FIGURE 1 shows a relatively small part of the volume of the container occupied by cargo 3, this has been done for clarity of description, and that in practice the profile of the arch members and stringers 12 would be lowered to conform more closely with the contour of cargo 3.

During the time cover 23 is being placed around cargo 3, it is desirable to position the cover to approximately the outline of the cargo, in order to eliminate the need to manually adjust the position of cover 23. Accordingly, there are provided extensible fastening means comprising lines 25 which attach points of cover 23 to bows 5. Each line 25 is attached at one end to the cover 23 by suitable ring tie fastenings. The other end each line 25 is received by a spring-loaded retractor mechanism 26. Each retractor 26 is attached to a point on one of bows 5, and is operative to urge the line attached thereto to move in the direction of bow 5. Further each retractor 26 applies to its line 26 a force such that all retractors working together are sufficient to lift the fastened points of cover 23 substantially up to bows 5 when cinch straps 24 have been removed from over the cover. In this fashion, cover 23 is held up and out of the way when straps 24 have been removed. With cover 23 drawn up to bows 5, a lower edge of cover 23 may be detached from base 1, and a point of cover 23 laid up on a bow 5 or stringer 12 in order to allow now-exposed cargo 3 to be easily loaded onto or unloaded from the container without removing cover 23 from its place on the container.

In the foregoing description there is described a new and improved container. It will be obvious to those skilled in the art that a container may be made by introducing modifications to the above-described container without departing from the spirit of this invention.

What is claimed is:

1. A container having a base and at least one arch member, with the arch member extending from opposing sides and in an upward direction from an upward surface of the base;
    and with the arch member including a bow having first and second ends, and further including first and second pieces to secure respectively the first and second bow ends to opposite sides of the base;
    the combination wherein:
    the bow includes means for bending the bow along the length thereof;
    and the first and second pieces are posts having lower ends respectively connected to the base, and having openings along their lengths to receive therein selected lengths of the respective ends of the bow;
    in order to determine the outline of the bow and arch member of which the bow is a part, as well as to limit the width of the bow to substantially that of the base, and therewith set an end elevation of the container to a desired contour.

2. A container according to claim 1, in which there are provided first and second arch members to extend in substantially parallel relationship to each other from opposing ends of the base;
    with the bow of each of the arches having a plurality of substantially rigid sections; and
    the bendable means including a plurality of hinges, with each of the hinges being operative for joining one of the bow sections to the next-adjacent bow section;
    with at least some of the hinges in each of the bows including detents operative to fix the angular relationship to which the next-adjacent bow sections have been set;
    whereby the bows are self-supporting in the outline to which they have been set.

3. The container of claim 2 and including the further combination of:
    at least one stringer member extending between upper portions of the bows of the first and second arches;
    in order to hold the arch members in spaced-apart relation and to further define the contour of the container.

4. The container of claim 1 wherein there are provided:
    pivots for securing the pieces to the base;
    the pivots being disposed to constrain the arch member including the pieces and bow thereof to rotate between the upwardly-extending position and a position substantially parallel to and closely spaced from the upward facing surface of the base
    whereby the volume of the container may be reduced when the container is not in use.

5. The container of claim 3, having the further combination of:
    with the stringer member also including a strap member surrounding a portion of the bow of one arch member to attach pivotally thereto a first end of the stringer member;
    and means to detachably connect to a portion of the bow of the other arch member the other end of the stringer member.

6. The container of claim 2 adapted to receive cargo of irregular contour of the upward facing base surface;
    where there are further provided:
    a flexible cover disposed between the arch members and the cargo; and
    cinch straps to pass between the edges of the base and over the cargo and cover to secure the cover to the contour of the cargo
    the further combination of:
    a plurality of extensible fastening means including lines extending from the arch member to points on the cover to suspend the cover above the base surface in substantial conformity with the contour of the cargo.

7. The container of claim 6, wherein:
    each of the fastening means includes a spring-loaded retractor connected to a point on one of the arch member bows;
    with each retractor being operative to urge the line and the point on the cover fastened thereto in the direction of the bow to which the retractor is connected;
    the retractors being jointly effective to lift the points of the cover connected to the lines substantially up to the bows when the cinch straps over the cover are released.

References Cited
UNITED STATES PATENTS

| | | | |
|---|---|---|---|
| 2,556,418 | 6/1951 | Del Mar | 220—1.5 |
| 2,521,042 | 9/1950 | Cherwin | 135—4 |
| 3,212,512 | 10/1965 | Morris | 135—3 |
| 3,223,098 | 12/1965 | Dole | 135—4 |

FOREIGN PATENTS

Re. 76,092  7/1961  France.

WILLIAM T. DIXSON, JR., Primary Examiner

U.S. Cl. X.R.

206—60; 214—10.5; 220—6; 294—67